LOUIS MARKS.
Improvement in Carbureters for Air and Gas.
No. 114,316. Patented May 2, 1871.
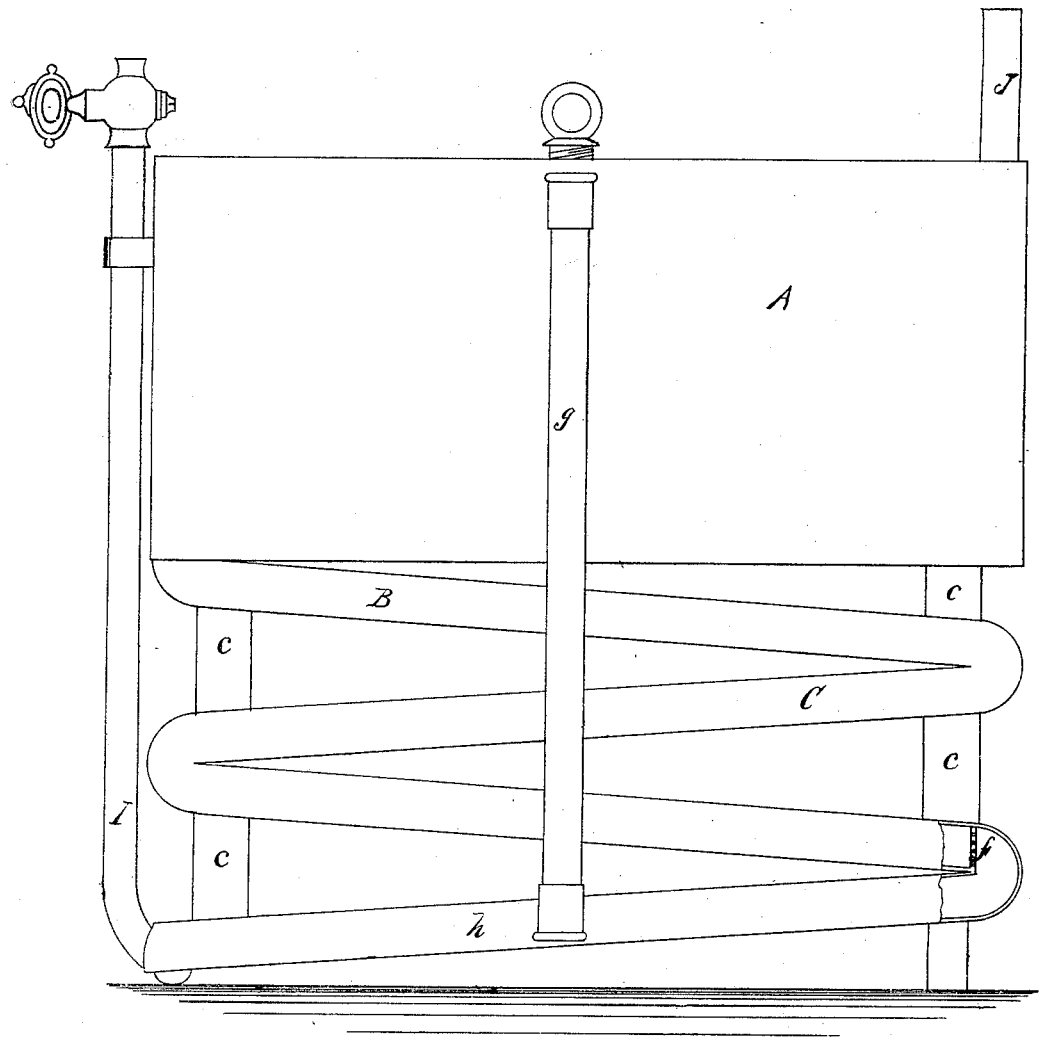

UNITED STATES PATENT OFFICE.

LOUIS MARKS, OF SAN FRANCISCO, CALIFORNIA.

IMPROVEMENT IN CARBURETERS FOR AIR AND GAS.

Specification forming part of Letters Patent No. 114,316, dated May 2, 1871.

*To all whom it may concern:*

Be it known that I, LOUIS MARKS, of the city and county of San Francisco, State of California, have invented an Improved Machine for Carbureting Air; and I do hereby declare the following description and accompanying drawing are sufficient to enable any person skilled in the art or science to which it most nearly appertains to make and use my said invention or improvements without further invention or experiment.

My invention relates to an improved machine for carbureting air for the purpose of producing an illuminating-gas; and it consists of a vessel to the lower portion of which is fixed a series of shallow oppositely-inclined boxes, the opposite ends of which are connected.

The gasoline or other light oil is placed in the upper box and immediately fills the inclined series. The air is driven into the lower shallow box, and is compelled by pressure to follow the inclined boxes through the gasoline up into the upper tank, where it is drawn off for use, having become thoroughly saturated with the vapor during its passage through the oil.

In order to more fully illustrate my invention, reference is had to the accompanying drawing, forming a part of this specification, in which—

A represents a tank or vessel of any desired pattern. At one of the lower corners of this box is connected a shallow covered trough or box, B, which is of the same width as the tank A. This trough or box is inclined downward at any desired angle until it reaches the opposite end of the tank A, at which point another trough or box, C, is connected with it and in the opposite direction. These troughs may be increased to any desired number, so as to cause the air to be longer subjected to the action of the oil.

The lower end of each of the boxes is supported from the upper one by a pillar, *c*.

At the lower end of each of the inclined troughs or boxes is fixed a screen, *f*, across the passage, which causes the air to be compressed in order to pass through the openings, when it immediately scatters again through the oil.

A glass tube, *g*, is secured vertically to the side of the tank A, and extends down to the lower trough or box, *h*, with which its lower end communicates, thus furnishing a gage which indicates the height of the oil in the tank and boxes.

I is the tube through which the air is driven, and is connected with the lowermost of the series of zigzag troughs or boxes. The air is then compelled to pass through the oil throughout the entire length of the zigzag trough and through the screens at each end, during which passage it becomes thoroughly carbureted. The gas thus prepared is stored under pressure in the upper part of the tank A, from which it is drawn off through the pipe J for use. Any known device can be used for driving or forcing the air through the zigzag passage.

This device is very cheap and simple, and will occupy but little space, while, on account of the width of the zigzag boxes, the air will be exposed to a large surface in passing through them, and consequently will become thoroughly carbureted and fitted for illuminating purposes.

Having thus described my invention, what I claim, and desire to secure by Letters Patent, is—

The tank A, in combination with a zigzag series of inclined troughs, B C, provided with the screen *f*, and placed below and outside of the tank, and connected at their lower ends, substantially as and for the purpose described.

In witness that the above-described invention is claimed by me I have hereunto set my hand and seal.

LOUIS MARKS. [L. S.]

Witnesses:
L. POREP,
J. L. BOONE.